Patented Sept. 17, 1946

2,407,677

UNITED STATES PATENT OFFICE 2,407,677

PROCESS OF SEPARATING CARBAZOLE FROM CRUDES THEREOF

John O'Brochta and Hugh Rodman, Jr., Pittsburgh, Pa., assignors, by mesne assignments, to Koppers Company, Inc., a corporation of Delaware No Drawing. Application September 4, 1943, Serial No. 501,310

1 Claim. (Cl. 260—318)

This invention relates to improvements in methods of separating carbazole from crude anthracene and from other coal tar chemicals ordinarily occurring with carbazole. More particularly the invention relates to a method of precipitating potassium carbazolate from mixtures of coal tar chemicals containing carbazole.

Carbazole (diphenylenimine or dibenzopyrrole) is commonly associated with anthracene and phenanthrene principally in the anthracene fraction of coal tar and in the commercial commodity known as anthracene cake. Many attempts have been made to separate carbazole from anthracene and other chemicals associated therewith. Various methods have been proposed in which potassium hydroxide is mixed with crude anthracene generally in the presence of solvent or diluent, or at temperatures so high that separation of potassium carbazolate from the resulting complex mixture is impracticable. When solvents are employed as reaction media they are generally used in large volumes to dissolve not only anthracene and other compounds but also the less soluble carbazole associated therewith. In caustic fusion methods, when using no solvent during fusion, as previously practiced, in order to obtain a substantially satisfactorily purified product, large volumes of solvent are also needed for separating pitchy material left in the reaction mixture by repeated washings of the carbazolate.

We have discovered that when fused mixtures of carbazole, anthracene and other compounds normally found with carbazole are treated with potassium hydroxide, the potassium carbazolate formed is very sensitive to temperatures in excess of 235° C. while in the reaction medium. When the reaction is carried out at, for instance, 245-250° C. the resulting potassium carbazolate sinks to the bottom as a liquid and is trapped in its own decomposition product, a heavy, black, tarry, viscous material which settles as a separate liquid layer below an upper hydrocarbon layer.

In the process of the present invention potassium hydroxide and a crude mixture containing carbazole, are heated together, in the absence of volatile solvent, at temperatures below 235° C. and preferably between substantially 230° and 235° C. Potassium carbazolate is formed and precipitates out as clean, large, pale green crystals resembling sand in structure. Pitchy material such as that formed at even slightly higher temperatures is not formed at the above lower temperatures and is practically completely absent. There is no visible trace of any second liquid phase, and the crystals sink rapidly to the bottom.

The temperature range employed in the present invention and which is applicable to the reaction of caustic with carbazole in crude carbazole-bearing anthracene mixtures by the fusion method in order to convert the soluble carbazole into insoluble carbazolate is limited on the high side by a temperature of 235° C. and on the low side by the freezing or solidifying point of the carbazole-bearing material to be fused, assuming that the carbazole contains impurities to the extent of over about 5 to 10%, and/or that such impurities cause a depression of its melting point more than about 8° to 10° C. In this range, decomposition of the carbazolate into pitch is avoided.

The following specific examples, will serve to illustrate our method:

*Example 1.*—About 5050 parts by weight of anthracene cake containing about 21% carbazole mixed with anthracene and the ordinarily associated compounds are melted and solid potassium hydroxide of about 95% purity is slowly added in solid form to the molten cake up to the extent of about 456 parts by weight, which provides an excess of about 15% of potassium hydroxide above that theoretically or stoichiometrically required to transform all of the carbazole into carbazolate. The temperature of the reaction mass is maintained at about 230° C. while vigorously agitating it. As soon as the water formed in the reaction substantially ceases to come off as vapor, heating is stopped. Carbazolate crystals may be separated directly from the resulting reaction mixture by filtration or in any other suitable manner. For instance, the reaction mixture is dumped into a vessel containing a solvent such as xylene. The ratio of the reaction mixture to the solvent is about 1:3 by weight. The entire mass dissolves with the exception of the carbazolate. The insoluble carbazolate crystals are separated from the solvent-treated mass by filtration. The separated crystals are readily washed free from any adhering filtrate solution.

*Example 2.*—About 2000 parts by weight of 51% anthracene containing approximately 21% of carbazole are melted. About 168 parts by weight of solid KOH are added over a period of about one hour at 230° C. and with thorough agitation. The reaction is continued until water of evolution practically ceases, or is no longer visibly apparent, or for a period substantially not longer than that required to remove visibly evolved water from the reaction mass. The total reaction time is up to about three hours. Crystals of carbazolate form in the reaction mass and the latter is dumped into 1200 parts by weight of xylene. The insoluble carbazolate is separated from the resulting solution by filtration.

The separated potassium carbazolate may be treated by usual methods to obtain free carbazole as by hydrolyzing the carbazolate with water preferably at elevated temperatures and separating the free carbazole from the hydrolyzing agent. The carbazolate may be used as such in certain dye preparations or in the manufacture of N-vinyl carbazole used in resin manufacture. When the carbazole is recovered from the separated carbazolate obtained in our method, the yield is substantially theoretical. When the fusion temperature is above 235° C. the yield of carbazole is lowered to 50 to 60%.

What is claimed is:

In a process of separating carbazole from anthracene cake in the "fusion" method, the improvement comprising: mixing and agitating the anthracene cake, in the absence of a solvent-diluent, with solid potassium hydroxide while heating the mixture to a temperature sufficiently high to fuse the anthracene cake but preventing the temperature from rising above 235° C., whereby, the carbazole in the fused cake reacts with the potassium hydroxide to form potassium carbazolate in solid crystalline form, formation of pitchy decomposition products is prevented, and water formed by the reaction is evaporated; and thereafter separating by filtration the potassium carbazolate crystals from the resulting liquid mass.

JOHN O'BROCHTA.
HUGH RODMAN, Jr.